United States Patent Office 2,982,511
Patented May 2, 1961

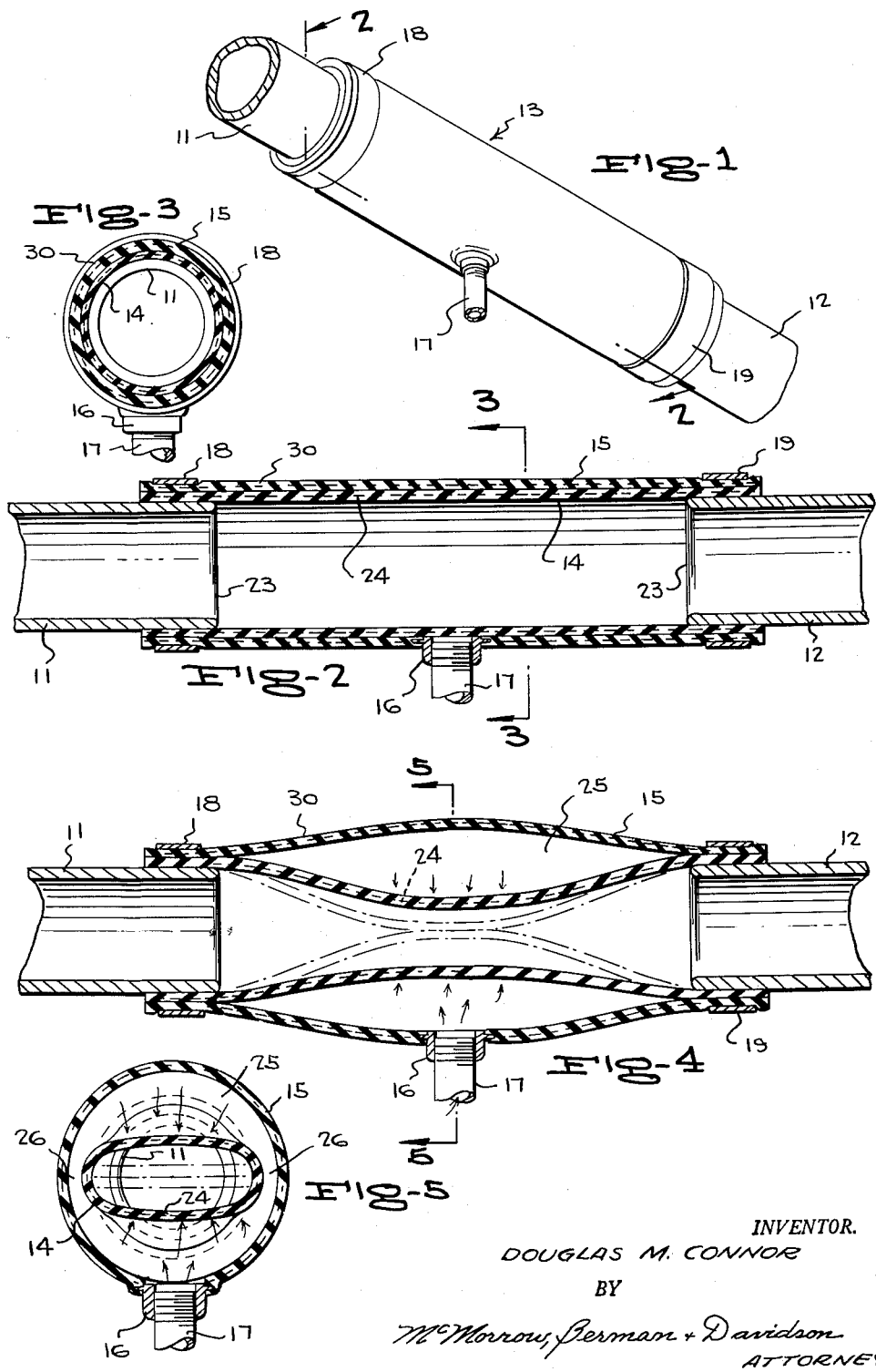

2,982,511

PRESSURE-OPERATED CONTROL VALVE

Douglas M. Connor, Hillcrest Road, Watchung, N.J.

Filed Feb. 27, 1959, Ser. No. 796,128

3 Claims. (Cl. 251—5)

This invention relates to fluid pressure-controlled valves, and more particularly a valve to be used for the purpose of regulating the flow of fluid or gases and controlling such flow in accordance with a controlled pressure transmitted in a gaseous or liquid control medium applied to the valve.

A main object of the invention is to provide a novel and improved fluid or gas pressure-operated control valve which is simple in construction, which is easy to install, and which provides accurate control in a pipe or tubing in which the valve is installed.

A further object of the invention is to provide an improved pressure-operated control valve which is inexpensive to manufacture, which is durable in construction, and which provides an electrically non-conductive connection between sections of the main conduit connected to the valve so as to prevent galvanic or other electrical action from occurring across the valve.

A still further object of the invention is to provide an improved pressure-operated control valve which may be installed in a line of pipe or tubing at any desired location by merely cutting out a section of the pipe or tubing and replacing the cut section with the valve, whereby there may be no necessity for providing flanges or threaded fittings to make the valve installation, and whereby installation of the valve may be quickly and easily accomplished without requiring use of special tools other than those necessary for cutting the pipe or tubing in which the valve is to be installed.

A still further object of the invention is to provide an improved pressure-operated control valve which may be opened, closed, or modulated by remote control of the control pressure, making it possible to locate the valve at the most efficient point in a section of pipe or tubing to be controlled, and making it possible to operate a series of such valves from a central location in response to one or more master control impulses.

A still further object of the invention is to provide an improved pressure-operated control valve which employs any suitable gas or liquid pressure as its operating medium, whereby the valve may be used without danger of causing an explosion in a hazardous location.

A still further object of the invention is to provide an improved pressure-operated control valve which is so arranged that the valve will remain open in the event of a failure of the control pressure, so that circulation of the controlled fluid will not be interrupted when a failure of the control pressure occurs.

A still further object of the invention is to provide an improved pressure-operated control valve which includes minimum restriction to flow of the controlled medium when it is fully open and which passes as much of said medium as an equivalent length of pipe or tubing in which it is installed, the valve being self-cleaning and resistant to abrasion from the controlled medium, and being adapted for use with a wide range of liquid or gaseous products.

Further objects and advantages of the invention will become apparent from the following description and claims, and from the accompanying drawings, wherein:

Figure 1 is a perspective view showing a pressure-operated control valve according to the present invention installed between a pair of axially aligned rigid pipe sections.

Figure 2 is an enlarged longitudinal vertical cross sectional view taken on line 2—2 of Figure 1.

Figure 3 is a transverse vertical cross sectional view taken on the line 3—3 of Figure 2.

Figure 4 is a longitudinal vertical cross sectional view, similar to Figure 2, but showing a substantial amount of control pressure applied to the valve, whereby the inner sleeve member thereof is flattened to decrease its cross sectional area and to reduce the flow of the material through the pipe sections, while at the same time the outer sleeve portion of the valve is expanded substantially uniformly to increase its diameter.

Figure 5 is a transverse vertical cross sectional view taken on the line 5—5 of Figure 4.

Referring to the drawings, 11 and 12 designate a pair of axially aligned spaced, open-ended rigid conduits between which is installed a fluid pressure-responsive valve device according to the present invention, said valve device being designated generally at 13.

The valve device 13 comprises a pair of concentrically arranged flexible sleeve members 14 and 15 of substantially identical length, the outer sleeve member 15 being provided at its intermediate portion with a conduit fitting 16 in which is engaged a conduit element 17 adapted to be connected to a suitable source of control pressure.

The end portions of the concentrically arranged resilient sleeve members 14 and 15 are engaged respectively over the ends of the rigid pipe sections 11 and 12 and are sealingly clamped thereon by means of a pair of conventional clamping bands 18, 19, in a conventional manner so as to clampingly secure the end portions of the sleeve members on the rigid pipe sections. The end portions of the pipe sections 11 and 12 are preferably chamfered or rounded, as shown at 23, to facilitate the engagement of the concentrically arranged sleeve members 14 and 15 on the pipe sections.

The sleeve members 14 and 15 are made of suitable resilient deformable material, such as rubber, neoprene, or the like, the outer sleeve member 15 being preferably provided with a fabric reinforcing and restraining layer 30 which restricts stretching of the matrix material surrounding the same, in response to pressure acting thereagainst, to the amount required to provide internal clearance for the inner sleeve member 14 to be squeezed to a flattened condition, as illustrated in Figure 5. The inner sleeve member 14 may be homogeneous or may be provided with a fabric reinforcing layer 24 for the purpose of adding structural strength when required by operating conditions. In other words, when the inner sleeve member 14 is placed under inwardly directed compression, as where the control pressure acting on its external surface exceeds the pressure acting internally thereof, the sleeve member 14 tends to flatten, as is illustrated, for example, in Figure 5, to reduce its cross sectional area but to expand its major diameter substantially beyond the normal length thereof. The control pressure acting on the internal surface of outer sleeve member 15 tends to expand its normal diameter to a length permitted by the fabric restraining layer 30, which is great enough to accommodate the additional major diameter of inner sleeve 14 when the latter is in a flattened condition.

The sleeve members 14 and 15 define therebetween a chamber 25 adapted to receive the operating control medium, which may be any suitable gas or liquid. When the pressure of the operating medium exceeds the pressure of the material flowing through the conduits 11 and 12, the chamber 25 expands, due to the flow of the operating fluid into the chamber 25 causing the outer sleeve member 15 to assume the outwardly expanded condition thereof illustrated in Figures 4 and 5, and causing the inner sleeve 14 to be squeezed to a flattened condition, as illustrated, whereby to reduce the cross sectional area of the intermediate portion of the inner sleeve member 14. The inward flow of the operating fluid first deforms the bottom of the inner sleeve member upwardly, as viewed in Figure 5, bending the inner sleeve member at diametrically opposite ends of its cross section (on a horizontal axis, as viewed in Figure 5), after which the operating fluid acts downwardly on the top of the inner sleeve member, reducing the radii of curvature of said opposite ends, which then become relatively rigid as compared with the top and bottom of the inner sleeve member. Because of the expansion of the stretchable outer sleeve member 15, which is a maximum at the intermediate portion of said outer sleeve member, the flattened inner sleeve member 14 may distort without being limited by engagement with the outer sleeve member 15. This is shown clearly in Figure 5 wherein it is seen that the enlargement of the intermediate portion of the outer sleeve member 15 provides ample clearance for the increase in diameter of the intermediate portion of the inner sleeve member 14 as said inner sleeve member is flattened in response to the relatively high control pressure developed in the chamber 25. As will be further apparent, as the control pressure in the chamber 25 is increased, to further flatten the intermediate portion of the inner sleeve 14, the outer sleeve member distorts further at its intermediate portion to maintain adequate clearance 26 between the end portions of the flattened intermediate section of sleeve 14 and the inside surface of the expanded outer sleeve 15.

As shown in Figure 4, the pressure in the control space 25 may be ultimately increased to a value sufficient to completely flatten the intermediate portion of the inner sleeve member 14, whereby to close the valve.

It will be further noted that when the control pressure is reduced, the inner sleeve member 14 is allowed to approach its normal configuration, and when the control pressure in space 25 is sufficiently reduced, the inner sleeve member 14 opens completely to establish the condition illustrated in Figure 2, wherein the inside cross section of inner sleeve 14 is substantially equal to the inside cross section of the pipe sections 11 and 12, providing unimpeded flow of material through the valve. If, for any reason, control pressure should fail, the valve assumes the condition illustrated in Figure 2, wherein no restriction whatsoever is imposed on the flow of the material through the imposing pipe sections 11 and 12. This arrangement prevents any hazardous condition from developing whenever a power failure occurs which removes the control pressure. Thus, a failure of the control pressure can cause no hazards or will produce no spoilage of the material flowing through the pipe sections 11 and 12.

It will be further apparent that the valve may be installed at any desired location in a line of pipe or tubing by merely cutting out a section of the pipe or tubing and replacing the cut section with the valve. It is further apparent that one valve or a series of valves, as above described, may be connected to the source of control pressure through a series of multi-ported manual or automatic control valves, whereby it becomes feasible to open and close a series of valves 13 in response to either a manual or automatic control impulse.

Because the valve may be opened, closed, or modulated by remote control of the control pressure, it is possible to place the valve in its most efficient location, which may be inaccessible while controlling its operation from a convenient location, or it is possible to operate a series of such valves from a central location.

Since the principle of operation of the valve relies upon the pressure differentials, namely, on the cooperation of two pressures separated by a pressure-tight resilient diaphragm, the diaphragm will be forced in the direction of the lower pressure. In the valve of the present invention, the pressure-tight diaphragm takes the form of a resilient pressure-tight control sleeve which, when pressure is applied to its outside surface, will gradually squeeze or constrict as the control pressure becomes greater, thus throttling the pressure or flow within the sleeve, or ultimately shutting it off entirely if the control pressure is permitted to increase to the required value. In general, the control pressure will be that pressure which is sufficient to overcome the pressure of the medium being controlled within the control sleeve, plus the additional pressure required to overcome the physical resistance of the control sleeve to squeezing or constriction. Accordingly, it will be readily apparent that close control of the control pressure will permit any degree of modulation of the volume of the medium passing through the valve, including complete shut-off or wide-open conditions.

While a specific embodiment of an improved pressure-operated control valve has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a pair of axially aligned, spaced, open-ended rigid conduits, a pair of concentrically arranged flexible sleeve members of generally circular normal cross section disposed between said rigid conduits and receiving the open ends of said rigid conduits thereon, the outer sleeve member normally closely enveloping the inner sleeve member, means sealingly clamping the end portions of said sleeve members on said rigid conduits, said sleeve members being made of resilient deformable material and being both adapted to deform responsive to pressure differential between the fluids in the space between the sleeve members and the interior of the inner sleeve member, whereby to vary the cross sectional areas of the inner sleeve member and the outer sleeve member in accordance with said pressure differential, the inner sleeve member being internally reinforced so that the peripheral length of the cross section of the inner sleeve member remains substantially constant when the inner sleeve member deforms, and whereby said inner sleeve member tends to flatten and elongate in cross section when subjected to a control pressure in the space between the sleeve members greater than that of the fluid in said inner sleeve member, the outer flexible sleeve member being free to expand and being sufficiently flexible to expand to an internal diameter greater than the maximum width of the inner sleeve member when said inner sleeve member is in its flattened condition, and conduit means connected to the intermediate portion of the outer flexible sleeve member and adapted to be connected to a source of control fluid under pressure.

2. In combination, a pair of axially aligned, spaced, open-ended rigid conduits, a pair of concentrically arranged flexible sleeve members of generally circular normal cross section disposed between said rigid conduits and receiving the open ends of said rigid conduits therein, the outer sleeve member normally closely enveloping the inner sleeve member, means sealingly clamping the end portions of said sleeve members on said rigid conduits, the outer sleeve member being made of resilient deformable material including a reinforcing and restraining fabric layer and the inner sleeve member being made of resilient deformable material including a reinforcing ply of non-stretchable fabric, whereby said sleeve members are both adapted to deform responsive to pressure differential between the fluids in the space between the sleeve members and the interior of the inner sleeve member, whereby to vary the cross sectional areas of the inner sleeve member and the outer sleeve member in accordance with said pressure differential, and whereby the peripheral length of the cross section of the inner sleeve member remains substantially constant when the inner sleeve member deforms, and whereby said inner sleeve member tends to flatten and elongate in cross section when subjected to a control pressure in the space between the sleeve members greater than that of the fluid in said inner sleeve member, the outer flexible sleeve member being free to expand and being sufficiently flexible to expand to an internal diameter greater than the maximum width of the inner sleeve member when said inner sleeve member is in its flattened condition, and conduit means connected to the intermediate portion of the outer flexible sleeve member and adapted to be connected to a source of control fluid under pressure.

3. In combination, a pair of axially aligned, spaced, open-ended rigid conduits, a pair of coaxially arranged flexible sleeve members disposed between said rigid conduits and receiving the open ends of said rigid conduits therein, the outer sleeve member normally closely enveloping the inner sleeve member, means sealingly clamping the end portions of said sleeve members on said rigid conduits, said sleeve member being made of resilient deformable material and being both adapted to deform responsive to pressure differential between the fluids in the space between the sleeve members and the interior of the inner sleeve member, whereby to vary the cross sectional areas of the inner sleeve member and the outer sleeve member in accordance with said pressure differential, the inner sleeve member being internally reinforced so that the peripheral length of the cross section of the inner sleeve member remains substantially constant when the inner sleeve member deforms, and whereby said inner sleeve member tends to flatten and elongate in cross section when subjected to a control pressure in the space between the sleeve members greater than that of the fluid in said inner sleeve member, the outer flexible sleeve member being free to expand and being sufficiently flexible to expand to an internal width greater than the maximum width of the inner sleeve member when said inner sleeve member is in its flattened condition, and conduit means connected to the intermediate portion of the outer flexible sleeve member and adapted to be connected to a source of control fluid under pressure.

References Cited in the file of this patent

UNITED STATES PATENTS

| | | |
|---|---|---|
| 1,475,288 | Diescher | Nov. 27, 1923 |
| 2,317,376 | Grove | Apr. 27, 1943 |
| 2,640,675 | Farris | June 2, 1953 |
| 2,716,575 | Vickers | Aug. 30, 1955 |

FOREIGN PATENTS

| | | |
|---|---|---|
| 210,521 | Great Britain | of 1924 |
| 546,891 | Italy | of 1956 |